United States Patent
Logvinov et al.

(10) Patent No.: US 9,871,669 B2
(45) Date of Patent: Jan. 16, 2018

(54) POWERLINE COMMUNICATIONS AUTOMOTIVE NETWORK

(71) Applicant: STMicroelectronics, Inc., Coppell, TX (US)

(72) Inventors: Oleg Logvinov, East Brunswick, NJ (US); Bo Zhang, Somerville, NJ (US); Huijuan Liu, Bridgewater, NJ (US); Michael John Macaluso, Jackson, NJ (US); James D. Allen, Rochester, NY (US)

(73) Assignee: STMicroelectronics, Inc., Coppell, TX (US)

( * ) Notice: Subject to any disclaimer, the term of this patent is extended or adjusted under 35 U.S.C. 154(b) by 322 days.

(21) Appl. No.: 14/559,779

(22) Filed: Dec. 3, 2014

(65) Prior Publication Data
US 2015/0180677 A1    Jun. 25, 2015

Related U.S. Application Data

(60) Provisional application No. 61/918,511, filed on Dec. 19, 2013.

(51) Int. Cl.
*H04L 12/18* (2006.01)
*H04L 12/40* (2006.01)
(Continued)

(52) U.S. Cl.
CPC ........ *H04L 12/1886* (2013.01); *B60R 16/023* (2013.01); *H04B 3/542* (2013.01);
(Continued)

(58) Field of Classification Search
CPC combination set(s) only.
See application file for complete search history.

(56) References Cited

U.S. PATENT DOCUMENTS

| 2004/0064775 A1* | 4/2004 | Gaskill | H04L 1/1887 714/749 |
| 2012/0230317 A1* | 9/2012 | Kim | H04L 1/1854 370/338 |

(Continued)

FOREIGN PATENT DOCUMENTS

| CN | 1338842 A | 3/2002 |
| CN | 102939737 A | 2/2013 |
| WO | 2013101953 A1 | 7/2013 |

OTHER PUBLICATIONS

"IEEE Standard for Broadband over Power Line Networks: Medium Access Control and Physical Layer Specifications," IEEE Communications Society, IEEE Std 1901-2010, Dec. 30, 2010, 1,586 pages.

(Continued)

*Primary Examiner* — Yee Lam
(74) *Attorney, Agent, or Firm* — Slater Matsil, LLP

(57) ABSTRACT

An embodiment is a powerline communications (PLC) apparatus including a communications interface that implements a first communication protocol including of a transceiver that communicates over an electrical power distribution wiring of a vehicle. The first communication protocol includes a powerline communications automotive network (PLCAN) delimiter type (DT) (PLCAN-DT), and a PLCAN variant length field in a frame control comprising payload length, a number of symbols used, a PHY block size, and a number of repetitions used, wherein broadcast addressing is used in the network to transmit messages.

33 Claims, 7 Drawing Sheets

(51) Int. Cl.
*H04L 29/08* (2006.01)
*H04B 3/54* (2006.01)
*B60R 16/023* (2006.01)

(52) U.S. Cl.
CPC .......... *H04L 12/1881* (2013.01); *H04L 12/40* (2013.01); *H04L 12/40032* (2013.01); *H04L 12/1863* (2013.01); *H04L 67/12* (2013.01); *H04L 2012/40215* (2013.01); *H04L 2012/40273* (2013.01)

(56) References Cited

U.S. PATENT DOCUMENTS

| | | | | |
|---|---|---|---|---|
| 2012/0320932 | A1* | 12/2012 | Xu | H04B 3/54 370/474 |
| 2014/0241441 | A1* | 8/2014 | Devaucelle | H04B 3/542 375/257 |
| 2015/0092545 | A1* | 4/2015 | Katar | H04B 3/542 370/230 |

OTHER PUBLICATIONS

"HomePlug AV White Paper," HomePlug Powerline Alliance, Document version No. HPAVWP-050818, 2005, 11 pages.

"HomePlug Green PHY 1.1: The Standard for In-Home Smart Grid Powerline Communications: An application and technology overview," HomePlug Powerline Alliance, Version 1.02, Oct. 3, 2012, 17 pages.

Jie, H.; "Research and Realization of Automobile PLC Bus"; Intelligence Control Technology, Zhejiand Wanli University Institute, Ningbo 315101, China; May 2008, 4 pages.

\* cited by examiner

| | Field | Octet Number | Bit Number | Field Size (Bits) | Definition |
|---|---|---|---|---|---|
| PLCAN Frame Control Block | DT_PLCAN | 0 | 0 - 2 | 3 | Delimiter Type |
| | ACCESS | | 3 | 1 | Access Field |
| | SNID | | 4 - 7 | 4 | Short Network Identifier |
| | VF_PLCAN | 1 - 12 | - | 96 | Variant field |
| | FCCS_PLCAN | 13 - 15 | - | 24 | PLCAN Frame Control Block Check Sequence |

| DT Value | Interpretation |
|---|---|
| 000 | Beacon |
| 001 | Start of Frame (SOF) |
| 010 | Selective Acknowledgment (SACK) |
| 011 | Request to Send (RTS)/Clear to Send (CTS) |
| 100 | Sound |
| 101 | Reverse Start of Frame (RSOF) |
| 110 | Powerline communications automotive network (PLCAN) |
| 111 | Reserved |

Fig. 5

| Field | Definition |
|---|---|
| DT_PLCAN | 0b110 (Delimiter Type) |
| ACCESS | Access Field |
| SNID | Short Network Identifier |
| STEI | Source Terminal Equipment Identifier |
| DTEI | Destination Terminal Equipment Identifier |
| LID | Link Identifier |
| CFS | Contention-Free Session |
| BDF | Beacon Detect Flag |
| HP10DF | HomePlug 1.0.1 Detected Flag |
| HP11DF | HomePlug 1.1 Detect Flag |
| EKS | Encryption Key Select |
| PPB | Pending PHY Blocks |
| BLE | Bit Loading Estimate |
| PBSz | PHY Block Size |
| NumSym | Number of Symbols |
| TMI_AV | Tone Map Index |
| Repetition | The number of times the PB is repeated |
| Payload Length | The payload length for each user's portion of the payload's length |
| # User | Number of users |
| User 1 ID | Identifies the first user ID |
| User 1 Length | Identifies the payload length for the first user ID, lowest number first |

Fig. 6A

| Field | Definition |
|---|---|
| Data 1 Type | Defines the type and use of the data |
| User 2 ID | Identifies the second user ID |
| User 2 Length | Identifies the payload length for the second user ID, lowest number first |
| Data 2 Type | Defines the type and use of the data |
| User n ID | Identifies the nth user ID |
| User n Length | Identifies the payload length for the nth user ID, lowest number first |
| Data n Type | Defines the type and use of the data |
| PRS ACK | PRS ACK support indication |
| FL_AV | Frame Length |
| MPDUCnt | MPDU Count |
| BurstCnt | Burst Count |
| BBF | Bidirectional Burst Flag |
| MRTFL | Max Reverse Transmission Frame Length |
| DCPPCF | Different CP PHY Clock Flag |
| MCF | Multicast Flag |
| MNBF | Multi-Network Broadcast Flag |
| RSR | Request SACK Retransmission |
| CLST | Convergence Layer SAP Type |
| MFSCmdMgmt | Management MAC Frame Stream Command |
| MFSCmdData | Data MAC Frame Stream Command |
| MFSRspMgmt | Management MFS Response for the data sent in the preceding Reverse SOFReverse SOF |
| MFSRspData | Data MFS Response for the data sent in the preceding Reverse SOFReverse SOF |
| BM-SACKI | Bit Map SACK info for the PBs sent in the preceding Reverse SOF |
| FCCS_AV | Frame Control Check Sequence |

Fig. 6B

POWERLINE COMMUNICATIONS AUTOMOTIVE NETWORK

PRIORITY CLAIM AND CROSS-REFERENCE

This application claims the benefit of the following provisionally filed U.S. patent application: Application Ser. No. 61/918,511, filed Dec. 19, 2013, and entitled "Powerline Communications Automotive Network," which application is hereby incorporated by reference.

TECHNICAL FIELD

The present invention relates generally to a means and apparatus for communicating between vehicle subsystems utilizing in-vehicle electrical power distribution network.

BACKGROUND

Modern vehicles (including but not limited to cars, buses, trains, and planes) consist of many elements, such as sensors, switches, actuators, motors, displays, and entertainment functions. For example, FIG. 1 illustrates an example vehicle assembly including a vehicle 10, a main wiring harness (partial) 20, a mirror motor 30, a driver door controller 40, a window motor 50, a driver door key sensor node and window switch node (inside) 60, a passenger door controller 70, a window motor 80, a passenger door key sensor node and window switch node (inside) 90, a mirror heater 100, a front door 120, and a passenger door 110.

The CAN (controller area network) bus was developed in 1983 to allow the different vehicle modules to communicate. The CAN bus uses four dedicated wires, and an open collector interface so the number of devices it can support on a bus is electrically limited. In modern vehicles there may be more than 70 nodes that need to be connected, and the CAN bus requires multiple bridged CAN networks in order to exceed the electrical limit. This results in additional complexity, expense, and weight.

SUMMARY OF THE INVENTION

An embodiment is a powerline communications (PLC) apparatus including a communications interface that implements a first communication protocol including of a transceiver that communicates over an electrical power distribution wiring of a vehicle. The first communication protocol includes a powerline communications automotive network (PLCAN) delimiter type (DT) (PLCAN-DT), and a PLCAN variant length field in a frame control comprising payload length, a number of symbols used, a PHY block size, and a number of repetitions used, wherein broadcast addressing is used in the network to transmit messages.

Another embodiment is a method including transmitting a powerline communication (PLC) message in a first communication protocol over an electrical power distribution wiring of a vehicle. Transmitting the powerline communication (PLC) message in a first communication protocol includes transmitting a PLC automotive network (PLCAN) delimiter type, transmitting the number of times to repeat the transmission of the PLC message over the electrical power distribution wiring of the vehicle, transmitting a first payload to a first user, and transmitting a second payload to a second user.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a table of delimiter types for a PLCAN MPDU frame control block according to an embodiment;

FIGS. 6A and 6B illustrate a table of the fields for a PLCAN MPDU frame control block according to an embodiment;

DETAILED DESCRIPTION OF ILLUSTRATIVE EMBODIMENTS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the invention, and do not limit the scope of the invention.

The present disclosure will be described with respect to embodiments in a specific context, namely a method and apparatus for a powerline communications (PLC) network used to communicate between controllers in a vehicle via the vehicle's existing electrical power wiring.

As discussed above, a modern vehicle includes many elements, such as sensors, switches, actuators, motors, displays, and entertainment functions which need to communicate with each other. In some cases, these devices may be connected together in convenient assemblies by function and or location. For example, all of the door actuators (e.g., door lock actuator), switches (e.g., window up/down switch, 90), and motors (e.g., window motor, 80) of a passenger door (e.g., 110) are all conveniently connected to a passenger door assembly control module (e.g., 70). The passenger door assembly control module (e.g., 70) typically consists of a microprocessor, including a CPU, memory, crystal, and interfaces/drivers specific to the subsystem element's needs. The door control module also contains a communications controller means to communicate between other subassemblies. For example, a switch (e.g., 60) to open and close a passenger window may be located on a driver's door and controlled by a driver door assembly control module (e.g. 40). In this example, the passenger door module and driver door module have to communicate with each other to complete the action.

In accordance with the present disclosure, a powerline communications (PLC) network is used to communicate between all of the controllers in the vehicle via the vehicle's existing electrical power wiring. In this disclosure, the network protocol is referred to as the powerline communications automotive network (PLCAN).

Figure 1:
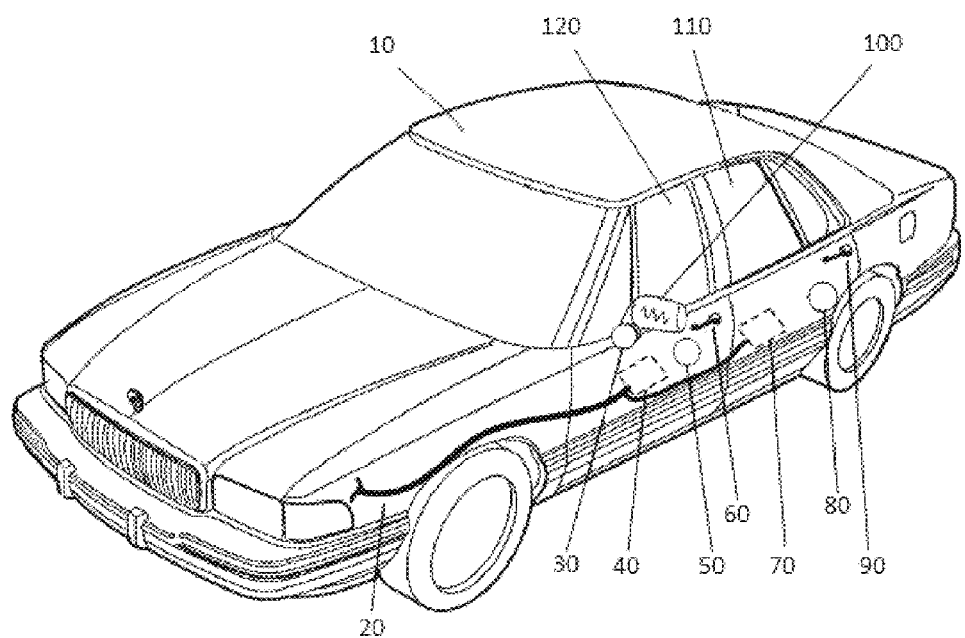
FIG. 1 illustrates an example vehicle including vehicle assemblies.
Figure 2:
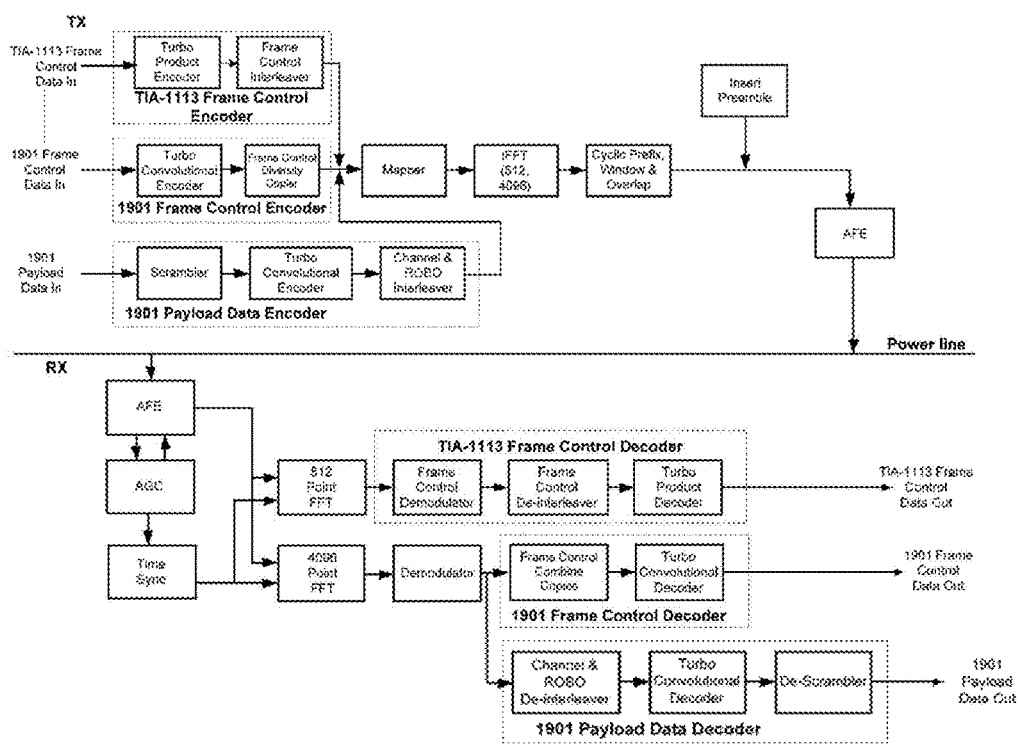
FIG. 2 illustrates a block diagram of a powerline communication (PLC) transceiver architecture.

FIG. 2 illustrates a block diagram of a PLC transceiver architecture. A common technology for PLC is specified in coexisting and interoperable standards such as the HomePlug Green PHY Specification, the HomePlug™ AV Specification and IEEE Std 1901-2010™ ("standards"), which are hereby incorporated by reference. The HomePlug Green PHY™ specification is used in plug-in electric vehicle DC charging systems, and the standards are also used in the home and by utilities. Therefore, the PLCAN should coexist and interoperate with the incorporated standards to avoid any potential adverse interactions and maximize the application opportunities.

The HomePlug Green PHY (HPGP) mini-robust orthogonal frequency-division multiplexing (OFDM) (mini-ROBO) mode defines a 136-octet frame control PHY protocol data unit (PPDU) payload and uses quadrature phase shift keying (QPSK) modulation, 917 carriers, a guard interval of 7.56 microseconds, ½ turbo convolution coding and repeats the message five times (using the robust OFDM) ROBO interleaver, sometimes referred to as the "repetition" function). It was specified this way to provide the maximum communications robustness and longest possible range in noisy channels. Because it is a small and robust PPDU, it is commonly used to set up a network, exchange network management messages, and for network beacon communication. Because PLC is a networked technology, the number of devices is limited by the network addressability, for example, HomePlug Green PHY can locally address $2^8$ (or 256) devices and $2^4$ (or 16) networks, for a total of 4,096 devices. As in any network, the practical number of local nodes is also limited by the amount of traffic the protocol can realistically support due to data rates and latencies, but this is well in the range of automotive applications.

The vehicle application, however, has a different set of requirements not anticipated by these standards. In the PLCAN application, there are no hidden nodes, the network size and configuration is highly stable, the channel noise characteristics and impedance are highly stable, and the traffic loading is highly predictable. Therefore, novel changes are presented that optimize communications for this application, and also reduce the cost and weight per the automotive industry needs.

In the preferred embodiment, the mini-ROBO mode is used at the appropriate time by the PLCAN to talk to (interoperate) with a standard PLC network. However, to communicate between vehicle control modules, the PLCAN protocol is used which consists of a new MPDU frame control delimiter type (DT), a PLCAN-DT (see FIGS. 4 and 5). The PLCAN-DT is not compatible with the standard PLC protocol. The vehicle can switch between protocols as needed. For example, the PLC compatible protocol may be used while the vehicle is parked, but the PLCAN may be used while the vehicle is moving. In some embodiments, the selection of protocol may also depend on the vehicle's location, which can be based on location data of the vehicle. The protocol itself may also be changed depending on the vehicle's needs. For example, if the rear view camera needs to transmit an image, higher performance communications may be needed which may require that other communication protocol parameters be used. The network may also use the network ID and/or time division multiple access (TDMA) or frequency division multiple access (FDMA) techniques to establish independent networks which have different data rate or latency requirements. For example, the vehicle body subsystem with its subassemblies, the engine control subsystem, the entertainment subsystem, and collision avoidance subsystem may have different network requirements, best addressed by establishing their own private networks within the vehicle power distribution system.

Figures 3, 4:
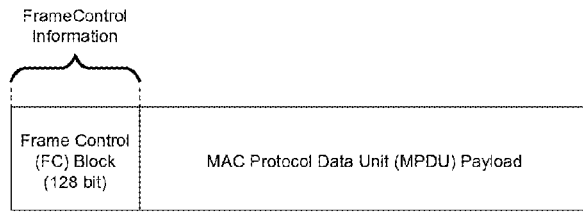
FIG. 3 illustrates an example of a powerline communication automotive network (PLCAN) frame format according to an embodiment.
FIG. 4 illustrates an example of a PLCAN MAC protocol data unit (MPDU) frame control block according to an embodiment.

FIG. 3 illustrates an example of a PLCAN frame format according to an embodiment. The PLCAN frame format includes a frame control block and a MDPU payload. FIG. 4 illustrates an example of a PLCAN frame control block according to an embodiment. The illustrated PLCAN frame control block includes five fields. These fields are a delimiter type (DT_PLCAN), an access field (ACCESS), a short network identifier (SNID), a variant field (VF_PLCAN), and a PLCAN frame control block check sequence (FCCS_PLCAN). FIG. 5 illustrates a table of delimiter types for a PLCAN MPDU frame control according to an embodiment with the new PLCAN-DT having a value of 110.

The PLCAN protocol MPDU frame control block is used to specify to the receiver, the unique information about the frame, for example, what type of frame it is, which also affects the definition of the frame type-dependent fields (variant fields). In the preferred embodiment both the PHY block size and the ROBO interleaver repetition can be different from the mini-ROBO size of 136-octet (128-octet PHY block). The preferred embodiment uses two repetitions to obtain the highest throughput. Three or four repetitions reduces throughput and increases latency but can be used to ensure communication reliability.

FIGS. 6A and 6B illustrate a table of fields for a PLCAN MPDU frame control according to an embodiment. The PLCAN MPDU frame control includes different fields over prior art. For example, the payload length, the number of symbols used, the PHY block size, and/or the number of repetitions used. The new fields further include number of users for multi-user communication and the IDs, payload data length, and payload data type for each of the users. These new fields can be defined in the Variant Length Field of Frame Control for the delimiter type of PLCAN, PLCAN-DT. In addition, the PHY hardware is designed to support the new delimiter. The channel and ROBO interleavers (and deinterleavers in the receiver) are also changed to support the fewer number of repetitions and smaller block size in the PLCAN application. The Turbo encoder and decoder are designed to yield best reliable communication on a variable block size, and the smaller block size also makes small data transfer more efficient. Because the vehicle power distribution network is physically small, predetermined, and does not change over time, there are no hidden nodes. Therefore, all of the traffic can be sent using broadcast mode. That is, all messages can be broadcast to all the PLCAN controllers on the network.

As mentioned above, the PLCAN application also supports multiple users or messages per payload. That is, the payload can be divided into sections allocated for specific functions or devices such as a specific switch's message, or a subsystem message. It can also be divided by its message content. In this latter case, the data contains the information such as which data is from which controller, its destination, and its purpose or content (type). The MAC layer is responsible for figuring out how to use the data.

Figure 7:
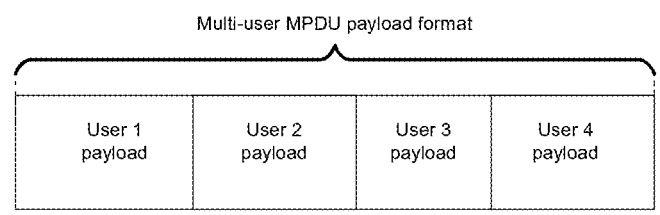
FIG. 7 illustrates an example of a multi-user MPDU with fixed-width payloads according to an embodiment.
Figure 8:
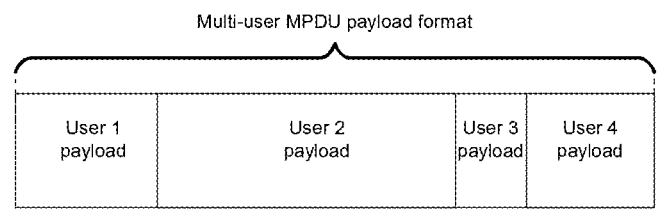
FIG. 8 illustrates an example of a multi-user MPDU with variable-width payloads according to an embodiment.

FIG. 7 illustrates an example of a multi-user MPDU with fixed-width payloads according to an embodiment, and FIG. 8 illustrates an example of a multi-user MPDU with variable-width payloads according to an embodiment. As illustrated, each PLCAN frame has four users with each user having their own payload. In other embodiments, each PLCAN frame can have more or less than four users.

In the cited standards, there are also priority resolution symbols that are sent in priority resolution slots (PRS) that are used to determine which PLC node has the highest priority traffic. Nodes contend by sending their request to transmit which contains a priority value. The lower priority traffic defers to the higher priority requests and all the higher priority traffic contends for access using carrier sense multiple access with collision avoidance (CSMA/CA) methods. During this process, data payload is not exchanged. Data is exchanged only after a node has permission to transmit.

Figure 9:
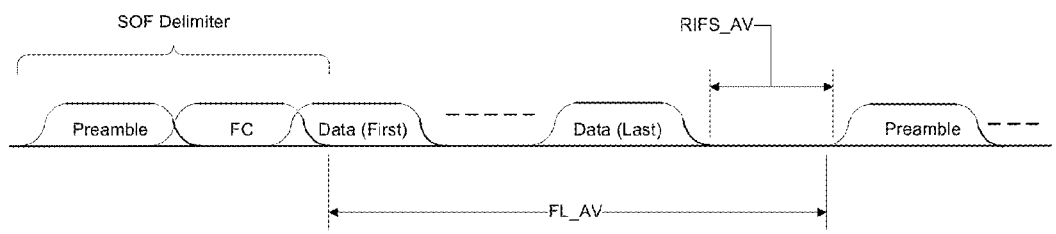
FIG. 9 illustrates a time sequence diagram of a typical PLC signal.
Figure 10:
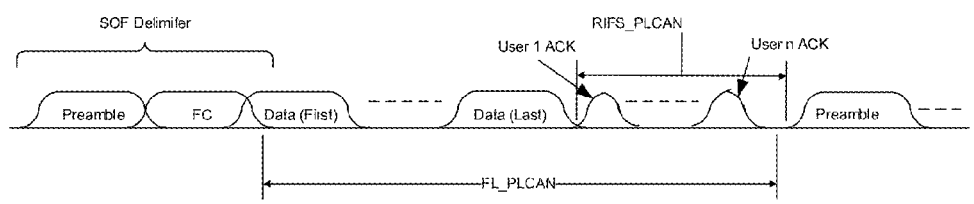
FIG. 10 illustrates a time sequence diagram of a PLCAN signal showing a multi-user acknowledgement according to an embodiment.

FIG. 9 illustrates a time sequence diagram of a typical PLC signal and FIG. 10 illustrates a time sequence diagram of a PLCAN signal showing a multi-user acknowledgement according to an embodiment. In a preferred embodiment, PLCAN can use the PRS symbols during the response interframe spacing (RIFS) (see FIGS. 9 and 10) and before the contention interframe space (CIFS) for acknowledgements (e.g., ACK) for each of the users. In some embodiments, PLCAN can use other short message types for the acknowledgements for each of the users. This greatly reduces the response (latency) time for simple messages as compared to normal data exchanges or using the contention period. This method is not compatible with the cited standards and is only available in the PLCAN mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    transmitting a powerline communication (PLC) message in a first communication protocol over an electrical power distribution wiring of a vehicle, wherein transmitting the PLC message in the first communication protocol comprises:
        transmitting a PLC automotive network (PLCAN) delimiter type;
        transmitting a PLCAN variant field (VF PLCAN) comprising a number of users, user identifications (IDs), payload length, payload data, and a repetition number, wherein the repetition number corresponds to a number of times the transmission of the PLC message is to be repeated over the electrical power distribution wiring of the vehicle; and
        transmitting a first payload to a first user;
    determining if the vehicle is in motion; and
    switching between the first communication protocol and a second communication protocol based on whether the vehicle is determined to be in motion, wherein the second communication protocol comprises a second PLC message transmitted over the electrical power distribution wiring of the vehicle.

2. The method of claim 1, further comprising transmitting a second payload to a second user.

3. The method of claim 2, wherein the first payload and the second payload are a same size.

4. The method of claim 2, wherein the first payload and the second payload are a different size.

5. The method of claim 2, wherein the PLCAN delimiter type is transmitted in a PLCAN frame control block, wherein the first and second payloads are transmitted during a medium access control (MAC) protocol data unit (MDPU) payload.

6. The method of claim 5, wherein the PLCAN frame control block is transmitted before the MDPU payload.

7. The method of claim 2 further comprising:
    transmitting an acknowledgement from the first user after a last payload has been transmitted in the PLC message and before a preamble of a next PLC message; and
    transmitting an acknowledgement from the second user after a last payload has been transmitted in the PLC message and before a preamble of a next PLC message.

8. The method of claim 7, wherein the acknowledgements from the first and second users are priority resolution slot (PRS) symbols.

9. The method of claim 1 further comprising:
    determining a location of the vehicle; and
    switching between the first communication protocol and the second communication protocol based on the location of the vehicle.

10. The method of claim 1 further comprising repeating the transmission of the PLC message at least two times.

11. The method of claim 1, wherein the PLC message is sent using broadcast addressing.

12. The method of claim 1, wherein the repetition number is two.

13. The method of claim 1, wherein the repetition number is three.

14. A method for communication between vehicle subsystems, the method comprising:
    transmitting a powerline communication (PLC) message in a first communication protocol over an electrical power distribution wiring of a vehicle, wherein transmitting the PLC message in the first communication protocol comprises:
        transmitting a PLC automotive network (PLCAN) delimiter type (DT_PLCAN);
        transmitting a PLCAN variant field (VF_PLCAN) comprising a number of users, user identifications (IDs), payload data, a payload length, a number of symbols, and a physical (PHY) block size; and
        transmitting a payload to a user;
    determining if the vehicle is in motion; and
    switching between the first communication protocol and a second communication protocol over the electrical power distribution wiring of the vehicle based on whether the vehicle is determined to be in motion.

15. The method of claim 14, wherein the PHY block size is from 128 bits to 136 bits.

16. The method of claim 14, further comprising:
    determining a location of the vehicle; and
    switching between the first communication protocol and a third communication protocol over the electrical power distribution wiring of the vehicle based on the location of the vehicle.

17. The method of claim 14, wherein the PLCAN delimiter type is transmitted in a PLCAN frame control block, and wherein the payload is transmitted during a medium access control (MAC) protocol data unit (MDPU) payload.

18. The method of claim 17 further comprising transmitting an acknowledgement from the user after a payload has been transmitted in the PLC message and before a preamble of a next PLC message.

19. The method of claim 18, wherein the acknowledgement from the user is a priority resolution slot (PRS) symbol.

20. The method of claim 14, wherein the PLC message is sent using broadcast addressing.

21. A method for multi-user communication between vehicle subsystems, the method comprising:

transmitting a powerline communication (PLC) message in a first communication protocol over an electrical power distribution wiring of a vehicle, wherein transmitting the PLC message in the first communication protocol comprises:
  transmitting a PLC automotive network (PLCAN) delimiter type (DT_PLCAN);
  transmitting a PLCAN variant field (VF_PLCAN) comprising a number of users, user identifications (IDs), payload length, and payload data; and
  transmitting each of a plurality of payloads to a corresponding plurality of users in accordance with the VF_PLCAN;
determining if the vehicle is in motion; and
switching between the first communication protocol and a second communication protocol based on whether the vehicle is determined to be in motion, wherein the second communication protocol comprises a second PLC message transmitted over the electrical power distribution wiring of the vehicle.

22. The method of claim 21, further comprising dividing a payload into the plurality of payloads prior to transmitting each of the plurality of payloads.

23. The method of claim 22, wherein the dividing the payload is in accordance with a function corresponding to each of the plurality of payloads.

24. The method of claim 22, wherein the dividing the payload is in accordance with a message content corresponding to each of the plurality of payloads.

25. The method of claim 24, wherein each of the plurality of payloads contain information of one or more of the data controller source, data destination, data purpose, or data content.

26. The method of claim 21, wherein a length of each of the plurality of payloads has a variable-width.

27. The method of claim 21, wherein a length of each of the plurality of payloads has a same width.

28. The method of claim 21, wherein the PLCAN delimiter type is transmitted in a PLCAN frame control block, and wherein each of the plurality of payloads is transmitted during a medium access control (MAC) protocol data unit (MDPU) payload.

29. The method of claim 21 further comprising transmitting an acknowledgement from each of the plurality of users after a corresponding payload has been transmitted in the PLC message and before a preamble of a next PLC message.

30. The method of claim 29, wherein the acknowledgement from each of the plurality of users is a priority resolution slot (PRS) symbol.

31. The method of claim 21, wherein the payload length further comprises more than one payload length, each of the more than one payload lengths being associated with a different user ID.

32. The method of claim 21, further comprising:
  determining a location of the vehicle; and
  switching between the first communication protocol and a second communication protocol over the electrical power distribution wiring of the vehicle based on a location of the vehicle.

33. The method of claim 21, wherein the PLC message is sent using broadcast addressing.

* * * * *